Sept. 15, 1959 R. L. KROON 2,904,093
ANTI-SKID DEVICE FOR TIRES
Filed Dec. 13, 1956

Ray L. Kroon
INVENTOR.

BY *Clarence A. O'Brien*
*and Harvey B. Jacobson*
Attorneys

2,904,093
ANTI-SKID DEVICE FOR TIRES

Ray L. Kroon, Pardeeville, Wis.

Application December 13, 1956, Serial No. 628,199

1 Claim. (Cl. 152—210)

The present invention relates generally to pneumatic vehicle tires and has for its primary object to provide, in a manner as hereinafter set forth, novel skid preventing and traction increasing means for such tires, thus promoting safety particularly on ice or snow.

Another very important object of the invention is to provide a skid preventing, traction increasing device of the character described which is self-cleaning and adapted to undercut the ice or snow for maximum effectiveness.

Other objects of the invention are to provide an anti-skid device of the aforementioned character which will be comparatively simple in construction, durable, compact, efficient in use and which may be produced at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
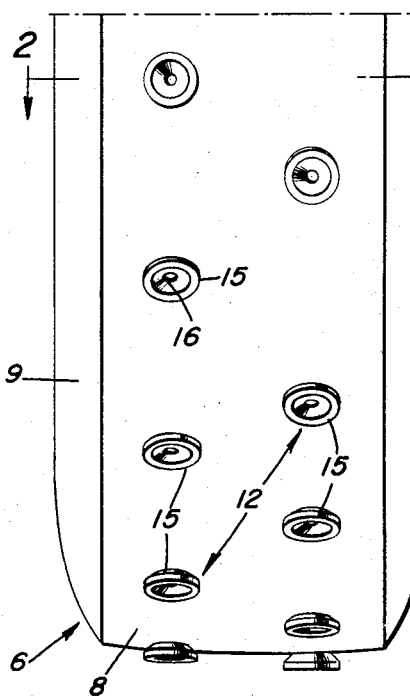
Figure 1 is a plan view of a portion of a pneumatic tire provided with anti-skid devices embodying the present invention.
Figure 2:
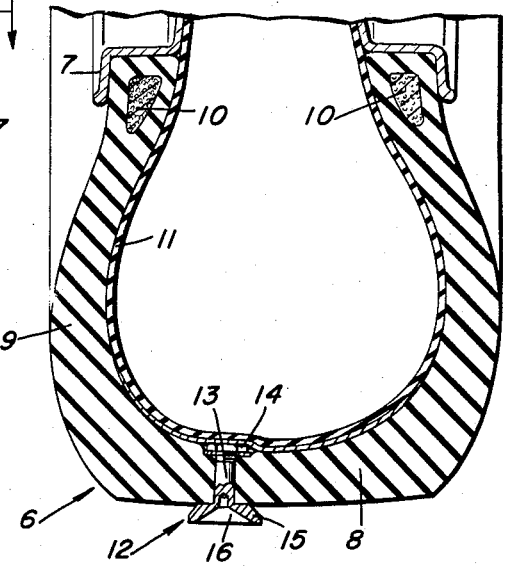
Figure 2 is a view in transverse section, taken substantially on the line 2—2 of Figure 1.
Figure 3:
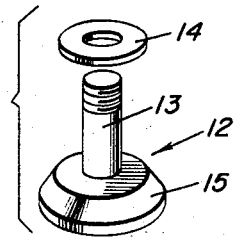
Figure 3 is a perspective view of the device per se, showing the parts separated.

Referring now to the drawing in detail and to Figures 1, 2 and 3 thereof in particular, it will be seen that reference character 6 designates generally a pneumatic tire casing. The casing 6, which is mounted on a drop-center wheel 7, comprises a tread 8, side walls 9 and the usual beads 10. Mounted in the casing 6 is a conventional inflatable inner tube 11.

The anti-skid device of the present invention comprises calks of suitable metal which are designated generally by reference character 12. The calks 12 are mounted at suitably spaced points around the tread 8 of the casing 6 in the manner shown to advantage in Figure 1 of the drawing.

Each calk 12 includes a shank 13 which extends through the tread 8 of the casing 6. Fixed in any suitable manner on the inner end portion of the shank 13 is a metallic washer or collar 14 which is engageable with the inner wall of the casing 6 for anchoring the calk 12 therein.

Formed integrally with the outer end of the shank 13 and seated on the tread 8 is a substantially frusto-conical, cup-like head 15. The head 15 has formed therein a substantially conical socket or recess 16.

It is thought that the manner in which the device functions will be readily apparent from a consideration of the foregoing. Briefly, any desired number of the calks 12 may be provided on the tread 8 of the casing 6. The substantially frusto-conical heads 15 are adapted to penetrate and undercut mud, snow, ice, etc., as the tire rolls thereover for preventing or resisting skidding and greatly increasing traction. The heads 15 of the calks 12 also function as vacuum or suction cups. Still further, the shape of the head 15 and the socket 16 therein is such as to render the calk self-cleaning. Thus, clogging is prevented and maximum efficiency is maintained.

Figure 4:
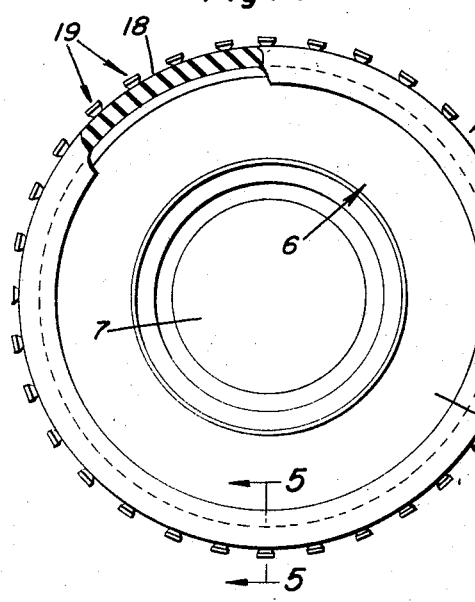
Figure 4 is a view in side elevation, with a portion broken away in section, of a modification.
Figure 5:
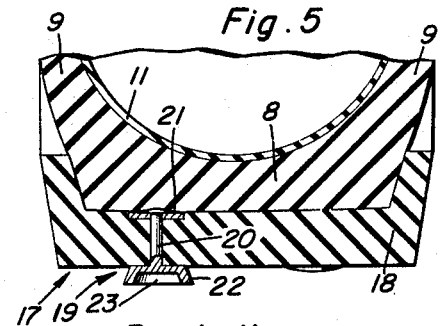
Figure 5 is a view in transverse section, taken substantially on the line 5—5 of Figure 4.

In the embodiment of Figures 4 and 5 of the drawing, reference character 17 designates an annular boot of suitable flexible material which is mounted on the casing 6, after which the tire is inflated. Mounted on the tread 18 of the boot 17 is a multiplicity of calks 19. Each calk 19 includes a metallic shank 20 which penetrates the tread 18 and has fixed on its inner end portion an anchoring washer or collar 21. Formed integrally with the outer end of the shank 20 is a substantially frusto-conical, cup-like head 22 comprising a flat bottom which seats on the tread 18, said head having formed therein a self-cleaning socket 23. As will be readily apparent, this embodiment of the invention is adapted for use on pneumatic tires which are already in service.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

An anti-skid device comprising an annular boot for mounting on a pneumatic tire and including a tread, and a plurality of calks mounted at circumferentially spaced points on the tread, each calk including a metallic shank penetrating the tread, an anchoring collar fixed on the inner end portion of said shank, and a substantially frusto-conical, cup-like head integral with the outer end of the shank and including a flat bottom seated on the tread, said head tapering outwardly from the tread adapting it to penetrate and undercut ice to prevent skidding, said head having a substantially conical socket therein having walls which diverge outwardly from said tread adapting said head to grip the driving surface by suction and to be self-cleaning.

References Cited in the file of this patent

UNITED STATES PATENTS

| 973,999 | Titus | Oct. 25, 1910 |
| 1,651,439 | Boyer | Dec. 6, 1927 |
| 2,571,020 | Earl | Oct. 9, 1951 |
| 2,697,468 | St. Pierre | Dec. 21, 1954 |

FOREIGN PATENTS

| 2,457 | Great Britain | 1909 |